United States Patent
Crespi et al.

(10) Patent No.: US 10,040,024 B2
(45) Date of Patent: Aug. 7, 2018

(54) SYSTEM FOR SULPHUR REMOVAL FROM A FLUE GAS

(71) Applicant: General Electric Technology GmbH, Baden (CH)

(72) Inventors: Mario Crespi, Trezzano sul Naviglio (IT); Carlo Ferrario, Usmate Velate (IT); Elisabetta Palini, Milan (IT)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/710,052

(22) Filed: Sep. 20, 2017

(65) Prior Publication Data

US 2018/0008929 A1 Jan. 11, 2018

Related U.S. Application Data

(63) Continuation of application No. PCT/EP2016/055748, filed on Mar. 17, 2016.

(30) Foreign Application Priority Data

Mar. 20, 2015 (EP) .................................. 15425023

(51) Int. Cl.
```
B01D 53/50     (2006.01)
B01D 53/18     (2006.01)
B01D 53/14     (2006.01)
B01F 5/00      (2006.01)
```
(52) U.S. Cl.
CPC ....... *B01D 53/185* (2013.01); *B01D 53/1481* (2013.01); *B01D 53/505* (2013.01); *B01F 5/0057* (2013.01); *B01D 2251/404* (2013.01); *B01D 2251/606* (2013.01); *B01F 2215/0036* (2013.01)

(58) Field of Classification Search
None
See application file for complete search history.

(56) References Cited

U.S. PATENT DOCUMENTS

| | | |
|---|---|---|
| 2,080,779 A | 5/1937 | Lessing |
| 4,189,309 A | 2/1980 | Hoekstra |
| 4,263,021 A | 4/1981 | Downs et al. |
| 4,371,508 A | 2/1983 | Weinzierl et al. |
| 5,084,255 A | 1/1992 | College et al. |
| 5,405,590 A | 4/1995 | Macedo et al. |
| 5,705,060 A | 1/1998 | Robberts |

(Continued)

FOREIGN PATENT DOCUMENTS

| | | |
|---|---|---|
| DE | 706 737 C | 6/1941 |
| DE | 27 21 063 A1 | 11/1978 |

(Continued)

OTHER PUBLICATIONS

Partial European Search Report and Opinion issued in connection with corresponding EP Application No. 15425023.7 dated Jul. 20, 2015.

(Continued)

*Primary Examiner* — Walter D. Griffin
*Assistant Examiner* — Jelitza M Perez
(74) *Attorney, Agent, or Firm* — GE Global Patent Operation; Cynthia W. Flanigan

(57) ABSTRACT

A system for sulphur removal from a flue gas. The system includes an absorber, a reaction tank and a buffer tank. The buffer tank is connected to the reaction tank by a communicating vessel passage.

10 Claims, 2 Drawing Sheets

(56) References Cited

U.S. PATENT DOCUMENTS

| | | |
|---|---|---|
| 8,337,790 B2 | 12/2012 | Welp et al. |
| 8,795,416 B2 | 8/2014 | McDonald et al. |
| 2009/0038475 A1 | 2/2009 | Meinander |
| 2012/0189522 A1 | 7/2012 | Fan et al. |
| 2014/0124068 A1 | 5/2014 | Johnson |

FOREIGN PATENT DOCUMENTS

| | | |
|---|---|---|
| DE | 31 36 155 A1 | 4/1982 |
| DE | 29 43 468 C2 | 12/1987 |
| DE | 10 2007 050 904 A1 | 5/2009 |
| EP | 0 339 683 A2 | 11/1989 |
| EP | 0 682 972 A2 | 11/1995 |
| EP | 0 654 441 B1 | 4/2000 |
| EP | 2 308 585 A2 | 4/2011 |
| EP | 2 335 804 A1 | 6/2011 |
| EP | 2 457 634 A1 | 5/2012 |
| GB | 1356972 A | 6/1974 |
| GB | 2 121 776 A | 1/1984 |
| GB | 2 171 776 A | 9/1986 |
| WO | 88/07023 A1 | 9/1988 |
| WO | 94/17898 A1 | 8/1994 |
| WO | 2004/028666 A1 | 4/2004 |
| WO | 2006/022885 A1 | 3/2006 |

OTHER PUBLICATIONS

Extended European Search Report and Opinion issued in connection with corresponding EP Application No. 15425023.7 dated Dec. 7, 2015.

Invitation to Pay Additional Fees issued in connection with corresponding PCT Application No. PCT/EP2016/055748 dated May 20, 2016.

International Search Report and Written Opinion issued in connection with corresponding PCT Application No. PCT/EP2016/055748 dated Jul. 27, 2016.

Office Action issued in connection with corresponding EP Application No. 15425023.7 dated Mar. 1, 2018.

SYSTEM FOR SULPHUR REMOVAL FROM A FLUE GAS

CROSS-REFERENCE TO RELATED APPLICATIONS

This application is related to International patent application PCT/EP2016/055748 entitled "SYSTEM FOR SULPHUR REMOVAL FROM A FLUE GAS" filed Mar. 17, 2016 which claims priority to European Patent Convention patent application 15425023.7 entitled "SYSTEM FOR SULPHUR REMOVAL FROM A FLUE GAS" filed Mar. 20, 2015, both of which are incorporated herein by reference in their entirety.

FIELD OF INVENTION

Embodiments of the present invention relate to a system for sulphur removal from a flue gas. The flue gas can for example be a flue gas generated in a boiler of a power plant for electric power generation. The boiler can burn a fossil fuel, such as coal.

BACKGROUND

Power plants can have a boiler that generates steam that is expanded in a steam turbine. The boiler further generates flue gas that is treated to remove impurities before the flue gas is vented into the atmosphere.

In order to reduce carbon dioxide emission into the atmosphere (carbon dioxide has a negative environmental impact), the boiler can burn a fossil fuel with pure or substantially pure oxygen, in presence of recirculated flue gas (oxy fuel combustion). Oxyfuel combustion allows generation of flue gas having a high content of carbon dioxide, to make it easier carbon dioxide separation and sequestration.

Since the flue gas has high content of carbon dioxide, the flue gas treatment systems downstream of the boiler must be so designed in order to prevent flue gas contamination with air or other gases, because this would dilute the carbon dioxide and would increase the effort for carbon dioxide separation.

Often the fossil fuel used in boilers (e.g. coal, but also other fossil fuels, such as oil) contains sulfur that during combustion generates $SO_2$, $SO_3$ and other sulphur compounds. These compounds can give corrosion problems (within the power plant) or acid rains (if vented) and must thus be removed from the flue gas.

Often, sulphur compounds are removed from the flue gas by reacting them with lime and/or limestone, generating calcium sulfite $CaSO_3$; calcium sulfite is then oxidized into calcium sulfate $CaSO_4$ (gypsum) with air; calcium sulfate is then removed.

Oxidation of calcium sulfite into calcium sulfate must be done preventing oxygen from contaminating the flue gas.

U.S. Pat. No. 8,337,790 discloses a system for sulphur removal having an absorber and a separate container with an oxidation chamber and a buffer chamber connected via an overflow. During operation the reaction chamber receives a suspension containing calcium sulfite $CaSO_3$ from the absorber; air is supplied into the reaction chamber to oxidize the calcium sulfite into calcium sulfate $CaSO_4$ that precipitates and is removed from the oxidation chamber. The sulphur free suspension passes to the buffer chamber by overcoming the overflow and is fed back to the absorber via a pump.

Since the reaction chamber and the buffer chamber are defined in one and the same tank, the air supplied into the reaction chamber is also above the suspension contained in the buffer chamber; this causes risks that air bubbles reach the absorber.

SUMMARY

An aspect of embodiments of the invention includes providing a system that counteracts the risks that air reaches the absorber.

These and further aspects are attained by providing a system in accordance with the accompanying claims.

BRIEF DESCRIPTION OF THE DRAWINGS

Further characteristics and advantages will be more apparent from the description of a preferred but non-exclusive embodiment of the system, illustrated by way of non-limiting example in the accompanying drawings, in which.

DETAILED DESCRIPTION

Figure 1:
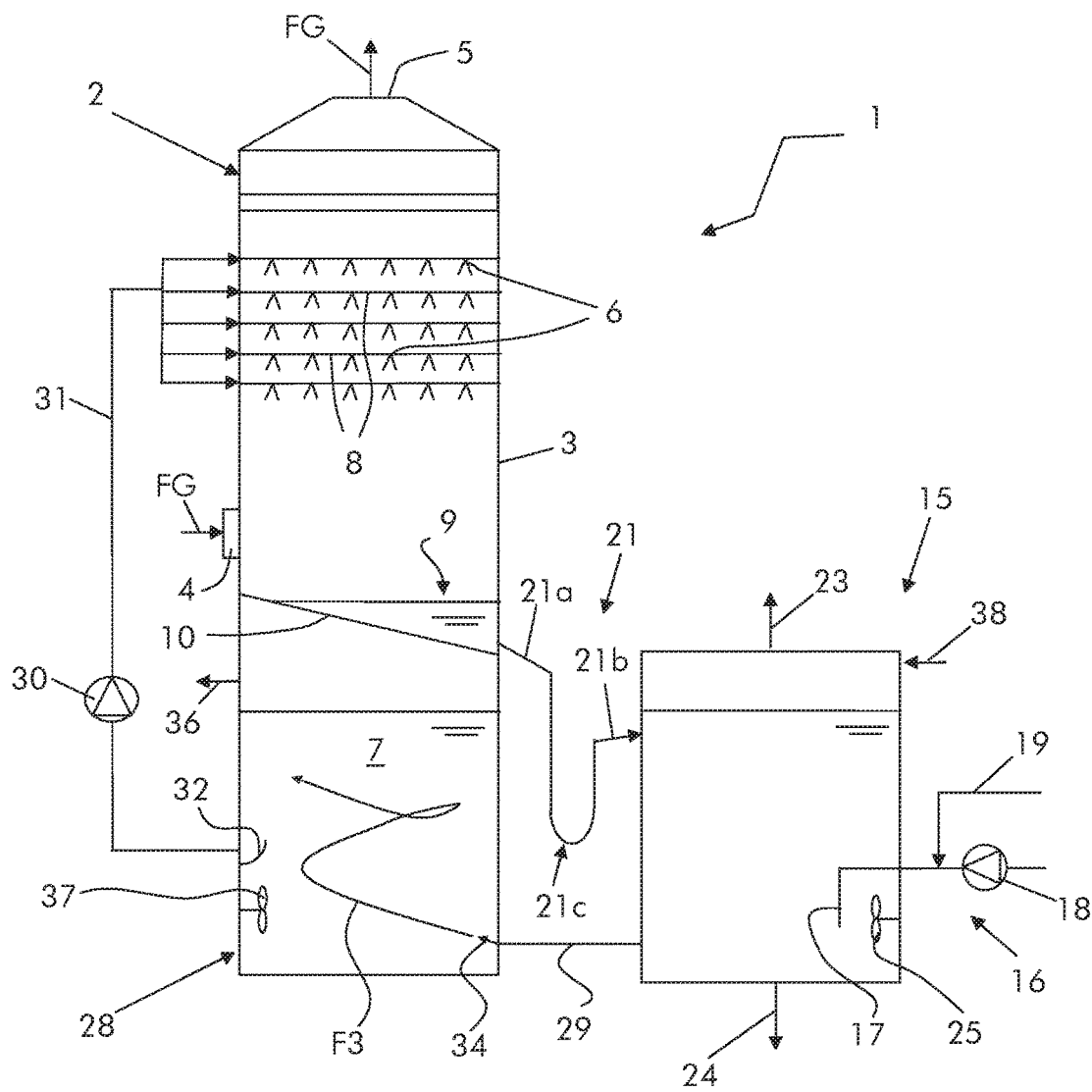
FIGS. 1 and 2 show a side schematic view and a schematic cross section through the buffer tank and reaction tank of the system.

With reference to the figures, these show a system 1 for sulphur removal from a flue gas.

The system 1 comprises an absorber 2 comprising a vessel 3 having an inlet 4 and an outlet 5 for the flue gas.

At the upper part of the absorber 2, nozzles 6 for spraying slurry 7 through the flue gas are provided. For example the nozzles 6 are connected to pipes or grids 8.

A slurry accumulation zone 9 is provided at the lower part of the absorber 2. The slurry accumulation zone 9 is below the inlet 4.

The slurry accumulation zone 9 can have an inclined bottom 10; in an embodiment, the inclined bottom 10 has a lower side facing the vessel wall.

The system further has a reaction tank 15 and a buffer tank 28. The reaction tank 15 and buffer tank 28 are separate tanks.

The reaction tank 15 is connected to the slurry accumulation zone 9, to receive slurry from the absorber 2; in addition, the reaction tank 15 has an oxidizing gas supply 16 into it. The oxidizer gas supply 16 can e.g. comprise a lance 17 fed with air by a compressor or fan 18; additionally, water can be added via a connection 19.

The slurry accumulation zone 9 is connected to the reaction tank 15 by a duct 21 comprising a gas lock. The gas lock can be any duct configuration or device that counteracts gas passage at least from the reaction tank 15 to the slurry accumulation zone 9.

For example, the gas lock comprises one or more inclined descending duct portions 21a, 21b of the duct 21 from the slurry accumulation zone 9 and reaction tank 15. In addition, the gas lock, in an embodiment, also comprises a syphon 21c. In this case the syphon 21c is, in an embodiment, connected between the descending inclined duct portions 21a, 21b.

The reaction tank 15 further has a vent 23 to draw the air and drainage 24 for removing solid precipitate generated during oxidation. An agitator 25 (or more agitators 25) for the slurry contained in the reaction tank is typically also provided.

The buffer tank 28 is connected to the reaction tank 15 and to the nozzles 6, for receiving slurry from the reaction tank 15 and supply the nozzles 6 with the slurry.

The buffer tank 28 is connected to the reaction tank 15 by a communicating vessel passage 29. This way the level of the slurry in the reaction tank 15 and in the buffer tank 28 is the same. The communicating vessel passage 29 is provided at the lower parts of the reactor tank 15 and buffer tank 28.

Depending on the configuration of the system it is contemplated that the communicating vessel passage 29 may extend tangentially from the reaction tank 15 or the buffer tank 28 or both.

The configuration of the communication vessel passage 29 and the curved plane causes the flow of the slurry to rotate F2, in an embodiment. In further embodiments, the flow of the slurry creates a vortex F2 in the buffer tank 28. The velocity of the vortex decrease the air bubbles of the slurry by forcing the air from the slurry mixture to the center of the vortex, in an embodiment. Additionally, the reaction tank 15 and/or the buffer tank 28 may comprise a curved plane; this plane may be circular, elliptical, or otherwise curved. The configuration of the communicating vessel passage 29 and the curved plane effect the flow of the slurry in both the reaction tank and buffer tank. For example, the resulting flow may have a nonlimiting advantage of reducing the air bubbles the slurry in the buffer tank.

The buffer tank 28 is connected to the nozzles 6 via a pump 30 and piping 31 connected to the pipes or grids 8. The buffer tank 28 houses a baffle 32 to shield the pump suction.

Figure 2:
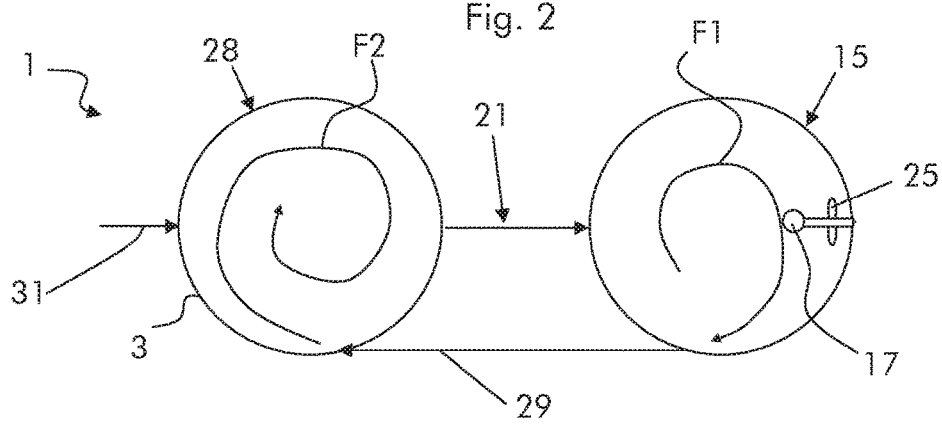

In one embodiment, the reaction tank 15 has a circular or elliptical or curved cross section (the figures show a circular cross section), and the communicating vessel passage 29 is eccentrically connected to the reaction tank 15; in an embodiment, the communicating vessel passage 29 is substantially tangentially connected to the reaction tank 15 (FIG. 2).

Likewise, in an embodiment, the buffer tank 28 has a circular or elliptical or curved cross section (circular in the figures) and the communicating vessel passage 29 is eccentrically connected to the buffer tank 28; in an embodiment, the communicating vessel passage 29 is substantially tangentially connected also to the reactor tank 15 (FIG. 2).

In contrast, the duct 21 can be connected to the vessel 3 and reactor tank 15 at the centre or substantially at the centre thereof (but this is not mandatory and this connection can be any).

The communicating vessel passage 29 has nozzles 34 for supplying slurry into the buffer tank 28; these nozzles 34 face upwards. This configuration gives the slurry an ascending movement that enhances separation of possible residual air bubbles.

In addition, a vent 36 is provided at the upper part of the buffer tank 28 and an agitator 37 (or more agitators 37) at a lower part thereof.

The reaction tank 15 and the buffer tank 28 are separate tanks, i.e. they are defined by different vessels. In an embodiment, the buffer tank 28 is defined within the vessel 3 and at the bottom of the vessel 3; in this case the vessel 3 has a wall (that can be the bottom 10 of the slurry accumulation zone 9) that isolates the absorber 2 from the buffer tank 28.

The operation of the system is apparent from that described and illustrated and is substantially the following.

Flue gas FG containing sulphur dioxide $SO_2$ is supplied into the absorber 2 via the inlet 4 and passes through the absorber 2. Slurry containing calcium carbonate $CaCO_3$ is sprayed via the nozzles 6 to contact the flue gas and remove the sulphur dioxide $SO_2$ forming calcium sulphite, according to the reaction:

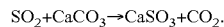

$$SO_2 + CaCO_3 \rightarrow CaSO_3 + CO_2.$$

Flue gas deprived from sulphur dioxide is discharged from the outlet 5.

The slurry now containing calcium sulphite $CaSO_3$ accumulates in the slurry accumulation zone 9 and passes via the duct 21 into the reaction tank 15.

The particular configuration of the duct 21 (with one or more inclined portions 21a and 21b and possibly with the syphon 21c and/or with additional devices) prevents air to pass from the reaction tank 15 into the slurry accumulation zone 9.

In the reaction tank 15 air is supplied via the lance 17; possibly also water in supplied via the connection 19 and fresh lime or limestone can be supplied with a supply 38.

In the reaction tank 15 the air supplied from the lance 17 oxidizes the calcium sulphite $CaSO_3$ into calcium sulphate $CaSO_4$, also with the help of the agitator 25 that helps mixing the slurry.

The calcium sulphate $CaSO_4$ (gypsum) precipitates and is removed through the drainage 24.

The slurry passes from the reaction tank 15 into the buffer tank 28 via the communicating vessel passage 29, which guarantees that the level of the slurry within the reaction tank 15 and buffer tank 28 is the same.

In addition, since the communicating vessel passage 29 is tangentially connected to the reaction tank 15, the slurry moving out from the reaction tank 15 causes rotation of the slurry within the reaction tank 15, as indicated by arrow F1. This further helps air separation within the reaction tank.

Air is removed from the reaction tank 15 via the vent 23.

The slurry within the buffer tank 28 is agitated by the agitator 37. In addition, since the communicating vessel passage 29 is tangentially connected also to the buffer tank 28, the slurry fed into the buffer tank 28 causes the slurry rotation within the buffer tank 28, as indicated by arrow F2. This helps air separation within the buffer tank 28.

Moreover, the nozzles 34 give the slurry supplied into the buffer tank 28 an upwards movement (as indicated by arrow F3) that further helps air separation.

Air is removed from the buffer tank 28 via the vent 36.

In addition, thanks to the shape of the reaction tank 15 and buffer tank 28 the risks of recirculation zones and material deposit within the reaction tank 15 and buffer tank 28 is reduced.

The ducting 31 then supplies the slurry (without air) to the nozzles 6.

The system can counteract air passage into the flue gas, because the air is supplied into the reactor tank 15 and is removed from the reactor tank 15 via the vent 23. Air cannot enter the buffer tank 28, because of the communicating vessel passage 29. In addition, even if some air enters the buffer tank 28, this air is separated from the slurry (thanks to the nozzles 34, tangential communicating vessel passage 29 and agitator 37) and is removed via the vent 36 and is not supplied into the absorber via the nozzles 6.

In an embodiment, when the system is started the slurry immediately circulates from the reaction tank 15 to the buffer tank 28 thanks to the communicating vessel passage 29; for this reason the size of the reaction tank 15 can be optimized according to the reaction time and the size of the buffer tank 28 can be optimized according to the design constrains and can also be small.

In contrast, according to U.S. Pat. No. 8,337,790, before slurry passage from the reaction chamber to the buffer chamber occurs, the piping between the buffer chamber and the nozzles of the absorber has to be filled with slurry. For this reason, the buffer chamber must be quite large and since the reaction chamber and the buffer chamber are defined in one and the same tank, the size of the reaction chamber cannot be optimized according to the reaction time.

In the following specific embodiments of the system are described.

The first embodiment, as depicted in FIGS. 1 and 2, has the absorber 2 and the buffer tank 28 defined within one and the same vessel 3, while the reaction tank 15 is a separate tank. The connection between the slurry accumulation zone 9 and the reaction tank 15 is done through the duct 21 having the inclined portions 21*a*, 21*b* and the syphon 21*c*.

Figure 3:
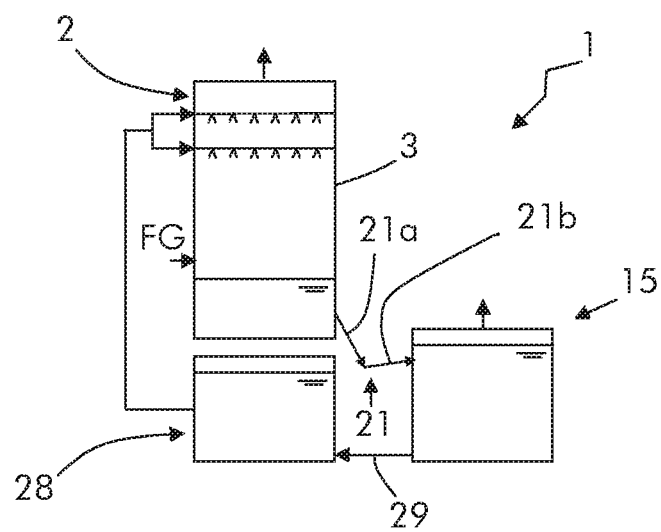
FIGS. 3 and 4 show the system.

The second embodiment, as depicted in FIG. 3, has the absorber 2 defined in the vessel 3, while the buffer tank 28 and the reaction tank 15 are separate tanks. The vessel 3 overlaps the buffer tank 28. The connection between the slurry accumulation zone 9 and the reaction tank is done through inclined duct portions 21*a*, 21*b*.

Figure 4:
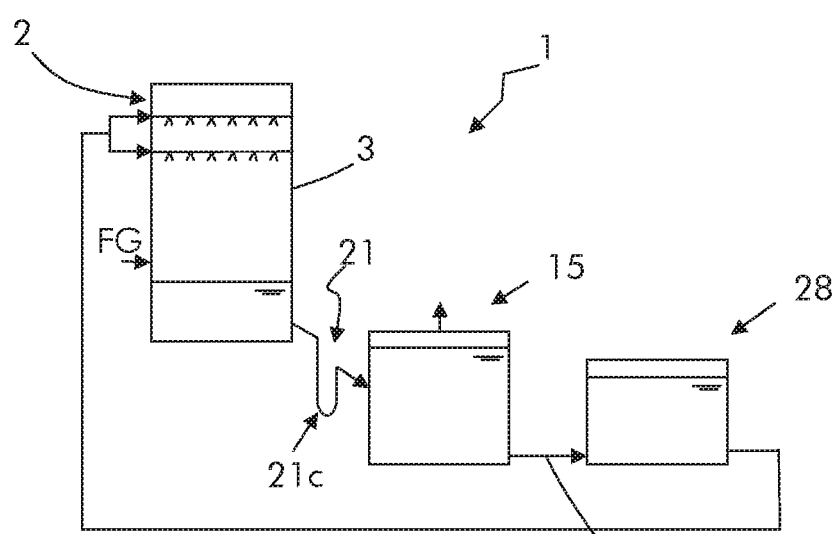

The third embodiment, as depicted in FIG. 4, has the absorber 2 defined in the vessel 3, while the buffer tank 28 and the reaction tank 15 are separate tanks. The vessel 3 is apart from the buffer tank 28. The connection between the slurry accumulation zone 9 and the reaction tank 15 is done through a duct 21 having a syphon 21*c*.

Naturally the features described may be independently provided from one another.

What is claimed is:

1. A system for sulphur removal from a flue gas, the system comprising
   an absorber comprising a vessel having an inlet and an outlet for the flue gas, nozzles for spraying a slurry through the flue gas and a slurry accumulation zone at the lower part of the absorber;
   a reaction tank having an oxidizing gas supply into it and connected to the slurry accumulation zone and comprising a curved plane section;
   a buffer tank connected to the reaction tank and to the nozzles, for receiving the slurry from the reaction tank and supply the nozzles with the slurry,
   wherein
   the slurry accumulation zone is connected to the reaction tank by a duct comprising a gas lock, and
   a communicating vessel passage is disposed between and connects the buffer tank and the reaction tank, wherein the communicating vessel passage is tangentially connected to the reaction tank and the buffer tank.

2. The system of claim 1, wherein the gas lock comprises descending inclined duct portions of the duct from the slurry accumulation zone and reaction tank.

3. The system of claim 2, wherein the gas lock comprises a syphon.

4. The system of claim 1, wherein the curved plane of the reaction tank has a circular or elliptical curve, and in that the communicating vessel passage is eccentrically connected to the reaction tank.

5. The system of claim 1, wherein the buffer tank has a curved plane section and in that the communicating vessel passage is eccentrically connected to the buffer tank.

6. The system of claim 1, wherein the communicating vessel passage has upward facing nozzles that provide slurry to the buffer tank.

7. The system of claim 1, wherein the slurry accumulation zone has an inclined bottom.

8. The system of claim 7, wherein the inclined bottom has a lower side facing a vessel wall.

9. The system of claim 1, wherein the buffer tank is connected to the nozzles via at least a pump, wherein the buffer tank houses at least a baffle to shield the pump suction.

10. The system of claim 1, wherein the buffer tank is defined within the vessel and at the bottom of the vessel, wherein the vessel has a wall that isolates the absorber from the buffer tank.

* * * * *